United States Patent
Strano et al.

(10) Patent No.: US 7,887,774 B2
(45) Date of Patent: Feb. 15, 2011

(54) METHODS FOR SELECTIVE FUNCTIONALIZATION AND SEPARATION OF CARBON NANOTUBES

(75) Inventors: Michael S. Strano, Lexington, MA (US); Monica Usrey, Madison, WI (US); Paul Barone, Allston, MA (US); Christopher A. Dyke, Houston, TX (US); James M. Tour, Bellaire, TX (US); W. Carter Kittrell, Houston, TX (US); Robert H Hauge, Houston, TX (US); Richard E. Smalley, Houston, TX (US); Irene Marie Marek, legal representative, Houston, TX (US)

(73) Assignee: William Marsh Rice University, Houston, TX (US)

( * ) Notice: Subject to any disclaimer, the term of this patent is extended or adjusted under 35 U.S.C. 154(b) by 13 days.

(21) Appl. No.: 12/496,100

(22) Filed: Jul. 1, 2009

(65) Prior Publication Data

US 2010/0028247 A1 Feb. 4, 2010

Related U.S. Application Data

(62) Division of application No. 10/566,073, filed as application No. PCT/US2004/024507 on Jul. 29, 2004, now Pat. No. 7,572,426.

(60) Provisional application No. 60/490,755, filed on Jul. 29, 2003.

(51) Int. Cl.
C01B 31/02 (2006.01)
C01B 31/00 (2006.01)
C07C 245/20 (2006.01)
D01F 9/12 (2006.01)
C08K 9/04 (2006.01)

(52) U.S. Cl. .............. 423/447.1; 423/447.2; 423/439; 423/460; 423/445 R; 423/461; 977/742; 205/432; 204/450; 204/451; 204/456

(58) Field of Classification Search .............. 423/447.1, 423/447.2, 439, 460, 445 R, 461; 205/432; 977/742; 204/450, 451, 456; D01F 9/12; C07C 245/20; C01B 31/00, 31/02
See application file for complete search history.

(56) References Cited

U.S. PATENT DOCUMENTS

| | | | |
|---|---|---|---|
| 2002/0130353 A1* | 9/2002 | Lieber et al. | 257/315 |
| 2002/0173083 A1* | 11/2002 | Avouris et al. | 438/129 |
| 2004/0040834 A1* | 3/2004 | Smalley et al. | 204/164 |

FOREIGN PATENT DOCUMENTS

WO WO02/060812 * 8/2002

OTHER PUBLICATIONS

Bahr et al ( J. Am. Chem. Soc 2001, 123, 6536-6542).*
Tour et al (WO 02/060812).*
Krupke et al (Science 2003, 301, 344-347).*
Bahr et al. (J. Am. Chem. Soc. 2001, 123, pp. 6536-6542).*
Dyke et al (Nano letters, 2003, 3:1215-1219).*
Kooi et al (Angew Chem Int Ed., 2002, 41:1353-1355).*
An, Kay Hyeok et al., "A Diameter-Selective Attack of Metallic Carbon Nanotubes by Nitronium Ions." J. Am. Chem. Soc. . 127. (2005): 5196-5203.
Balasuramanian, Kannan, and Marko Burghard. "Electrochemically Functionalized Carbon Nanotubes for Device Applications." J. Mater. Chem.. 18. (2008): 3071-3083.
Lee, Yoonmi et al., "Silencing of Metallic Single-Walled Carbon Nanotubes via Spontaneous Hydrosilylation." small. 5.12 (2009): 1398-1402.
Pan, Xiaoyong et al., "Species Enrichment of SWNTs with Pyrene Alkylamide Derivatives: is the Alkyl Chain Length Important?." Nanotechnology. 20. (2009): 1-9.
Wunderlich, D et al., "Preferred Functionalization of Metallic and Small-Diameter Single Walled Carbon Nanotubes via Reductive Alkylation ." J. Mater. Chem.. 18. (2008): 1493-1497.

* cited by examiner

*Primary Examiner*—Melvin C Mayes
*Assistant Examiner*—Jun Li
(74) *Attorney, Agent, or Firm*—Winstead PC

(57) ABSTRACT

The present invention is directed toward methods of selectively functionalizing carbon nanotubes of a specific type or range of types, based on their electronic properties, using diazonium chemistry. The present invention is also directed toward methods of separating carbon nanotubes into populations of specific types or range(s) of types via selective functionalization and electrophoresis, and also to the novel compositions generated by such separations.

30 Claims, 12 Drawing Sheets

METHODS FOR SELECTIVE FUNCTIONALIZATION AND SEPARATION OF CARBON NANOTUBES

CROSS REFERENCE TO RELATED APPLICATIONS

This application is a divisional application of U.S. patent application Ser. No. 10/566,073, filed Jan. 26, 2006, now U.S. Pat. No. 7,572,426 which is a 35 U.S.C. §371 National Stage entry of PCT Application serial no. PCT/US2004/024507, filed Jul. 29, 2004, which claims priority to U.S. Provisional Patent Application Ser. No. 60/490,755, filed Jul. 29, 2003. These priority applications are incorporated by reference herein in their entirety.

STATEMENT REGARDING FEDERALLY SPONSORED RESEARCH

The present invention was made in with support from the Robert A. Welch Foundation, Grant No. C-0689; the National Aeronautics and Space Administration, Grant Nos. NASA-JSC-NCC-9-77 and NASA TiiMS NCC-01-0203; the National Science Foundation, Grant Nos. DMR-0073046 and EEC-0118007; and the Air Force Office of Scientific Research, Grant No. F49620-01-1-0364.

FIELD OF THE INVENTION

The present invention relates generally to carbon nanotubes. More specifically, the invention relates to methods of selectively functionalizing carbon nanotubes by type, separating carbon nanotubes by type, and populations of functionalized carbon nanotubes separated by type to yield novel compositions.

BACKGROUND

Carbon nanotubes (CNTs), comprising multiple concentric shells and termed multi-wall carbon nanotubes (MWNTs), were discovered by Iijima in 1991 [Iijima, *Nature* 1991, 354, 56]. Subsequent to this discovery, single-wall carbon nanotubes (SWNTs), comprising a single graphene rolled up on itself, were synthesized in an arc-discharge process using carbon electrodes doped with transition metals [Iijima, S.; Ichihashi, T. *Nature* 1993, 363, 603; and Bethune et al. *Nature* 1993, 363, 605]. These carbon nanotubes (especially SWNTs) posses unique mechanical, electrical, thermal and optical properties, and such properties make them attractive for a wide variety of applications. See Baughman et al., *Science*, 2002, 297, 787-792.

The diameter and chirality of CNTs are described by integers "n" and "m," where (m,m) is a vector along a graphene sheet which is conceptually rolled up to form a tube. When $|n-m|=3q$, where q is an integer, the CNT is a semi-metal (bandgaps on the order of milli eV). When $n-m=0$, the CNT is a true metal and referred to as an "armchair" nanotube. All other combinations of n–m are semiconducting CNTs with bandgaps in the range of 0.5 to 1.5 eV. See O'Connell et al., *Science*, 2002, 297, 593. CNT "type," as used herein, refers to such electronic types described by the (m,m) vector (i.e., metallic, semi-metallic, and semiconducting).

The main hurdle to the widespread application of CNTs, and SWNTs in particular, is their manipulation according to electronic structure [Avouris, *Acc. Chem. Res.* 2002, 35, 1026-1034]. All known preparative methods lead to polydisperse materials of semiconducting, semimetallic, and metallic electronic types. See M. S. Dresselhaus, G. Dresselhaus, P. C. Eklund, *Science of Fullerenes and Carbon Nanotubes*, Academic Press, San Diego, 1996; Bronikowski et al., *Journal of Vacuum Science & Technology* 2001, 19, 1800-1805; R. Saito, G. Dresselhaus, M. S. Dresselhaus, *Physical Properties of Carbon Nanotubes*, Imperial College Press, London, 1998. Recent advances in the solution phase dispersion [Strano et al., *J. Nanosci. and Nanotech.*, 2003, 3, 81; O'Connell et al., *Science*, 2002, 297, 593-596] along with spectroscopic identification using bandgap fluorescence [Bachilo et al., *Science*, 2002, 298, 2361] and Raman spectroscopy [Strano, *Nanoletters* 2003, 3, 1091] have greatly improved the ability to monitor electrically distinct nanotubes as suspended mixtures and have led to definitive assignments of the optical features of semiconducting [Bachilo et al., *Science*, 2002, 298, 2361], as well as metallic and semi-metallic species [Strano, *Nanoletters*, 2003, 3, 1091].

Techniques of chemically functionalizing CNTs have greatly facilitated the ability to manipulate these materials, particularly for SWNTs which tend to assemble into rope-like aggregates [Thess et al., *Science*, 1996, 273, 483-487]. Such chemical functionalization of CNTs is generally divided into two types: tube end functionalization [Chen et al., *Science*, 1998, 282, 95-98], and sidewall functionalization [PCT publication WO 02/060812 by Tour et al.].

In view of the above, it would be particularly advantageous to have a method that is capable of selectively functionalizing CNTs, and SWNTs in particular, based on their electronic structure and/or properties.

SUMMARY

The present invention is directed toward a method of selectively functionalizing carbon nanotubes of a specific type or range of types, based on their electronic properties. The present invention is also directed toward methods of separating carbon nanotubes into populations of specific electronic types or range(s) of types via a combination of selective chemical functionalization and electrophoresis, and the novel compositions generated by such separations. Optionally, these isolated compositions can be thermally defunctionalized to yield populations of unfunctionalized, pristine carbon nanotubes of a specific electronic type or range of types.

The present invention provides the first selective reaction pathways of carbon nanotubes where covalent chemical functionalization is controlled by differences in the nanotube electronic structure. Such chemical pathways provide for the manipulation of nanotubes of distinct electronic types by selective functionalization of metallic nanotubes. Controlling nanotube chemistry in this way allows for the separation of semiconducting from metallic and semi-metallic nanotubes with high selectivity and scalability: a long sought goal of the carbon nanotube community.

Generally, methods of the present invention that provide for selectively functionalized carbon nanotubes, and particularly single-wall carbon nanotubes, involve reaction of solvent-suspended carbon nanotubes with one or more diazonium species. By exploiting the differential reactivity of such diazonium species toward metallic and semi-metallic carbon nanotubes, addition of a substoichiometric amount of diazonium species to a mixture of carbon nanotubes of varying type results in only the metallic and semi-metallic carbon nanotubes being functionalized. Such diazonium species permit the metallic and semi-metallic carbon nanotubes to be functionalized with a variety of chemical moieties.

In general, methods for selectively functionalizing carbon nanotubes comprise the steps: a) selecting a quantity of carbon nanotube material; b) suspending the carbon nanotube material in a solvent; and c) adding a chemical reactant that is able to selectively functionalize the carbon nanotube material based on the electronic properties of the nanotubes. Generally, the chemical reactant is added in a substoichiometric amount, and the reactant is typically a diazonium species.

In general, methods for separating carbon nanotubes on the basis of their electronic bandgap comprise the steps: a) functionalizing carbon nanotubes to yield a mixture of selectively-functionalized surfactant-suspended carbon nanotubes bearing phenol moieties, wherein a portion of the carbon nanotubes within the mixture have been selectively-functionalized and another portion within the mixture remains unfunctionalized; b) deprotonating the OH groups (on the phenol groups) present in the mixture of selectively-functionalized surfactant-suspended carbon nanotubes by increasing pH; and c) electrophoretically separating the functionalized carbon nanotubes from the unfunctionalized carbon nanotubes.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
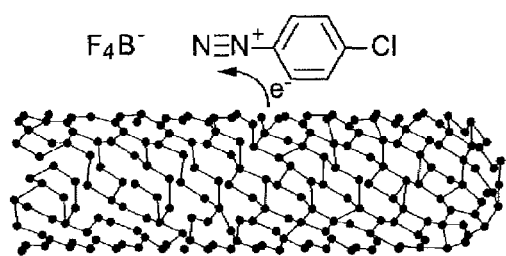
FIG. 1 depicts a reaction scheme, wherein (A) diazonium reagents extract electrons, thereby evolving $N_2$ gas and leaving a stable C—C covalent aryl bond to the nanotube surface; (B) the extent of electron transfer is dependent on the density of states in that electron density near $E_F$ leads to higher initial activity for metallic and semimetallic nanotubes; (C) the arene-functionalized nanotube may now exist as the delocalized radical cation, which could further receive electrons from neighboring nanotubes or react with fluoride or diazonium salts; and (D) a relative lack of electron density near $E_F$ occurs in semiconducting carbon nanotubes ($|n-m| \neq 3q$)

The present invention is directed toward methods by which carbon nanotubes can be chemically functionalized, in a selective manner, according to their precise electronic structure. The present invention is also directed toward methods of separating carbon nanotubes into populations of specific electronic types or range(s) of types via a combination of selective functionalization and electrophoresis, and also to the novel compositions generated by such separations. Optionally, these isolated compositions can be thermally defunctionalized to yield populations of unfunctionalized, pristine carbon nanotubes of homogeneous type.

The problem of separating carbon nanotubes based upon their electronic properties has been around since their initial synthesis in 1991. The problem stems from the fact that all current methods of producing CNTs yield inhomogeneous product of varying diameters and chiralities—and having various electronic structures. While there have been recent reports of separating SWNTs based on their electronic properties, there has been no successful demonstration of using electronic chemical selectivity to accomplish this feat. In fact, electronic selectivity has, up to now, not been demonstrated.

While not intending to be bound by theory, it is believed that the selective functionalization processes of the present invention involves an exploitation of charge transfer stability at the nanotube sidewall to direct the selective reaction of certain electronic structures over others. Such methods form a basis for manipulating and separating carbon nanotubes by their electronic structure via chemical means which, in some embodiments of the present invention, yields populations of carbon nanotubes having specific diameters, chiralities, and electronic properties. In some or other embodiments, populations of carbon nanotubes having specifically-tailored ranges of diameters, chiralities, and electronic properties are produced.

Carbon nanotubes (CNTs), according to the present invention, include, but are not limited to, single-wall carbon nanotubes (SWNTs), multi-wall carbon nanotubes (MWNTs), double-wall carbon nanotubes, buckytubes, fullerene tubes, tubular fullerenes, graphite fibrils, and combinations thereof. Such carbon nanotubes can be of a variety and range of lengths, diameters, number of tube walls, chiralities (helicities), etc., and can be made by any known technique including, but not limited to, arc discharge [Ebbesen, *Annu. Rev. Mater. Sci.* 1994, 24, 235-264], laser oven [Thess et al., *Science* 1996, 273, 483-487], flame synthesis [Vander Wal et al., *Chem. Phys. Lett.* 2001, 349, 178-184], chemical vapor deposition [U.S. Pat. No. 5,374,415], wherein a supported [Hafner et al., *Chem. Phys. Lett.* 1998, 296, 195-202] or an unsupported [Cheng et al., *Chem. Phys. Lett.* 1998, 289, 602-610; Nikolaev et al., *Chem. Phys. Lett.* 1999, 313, 91-97] metal catalyst may also be used, and combinations thereof. Depending on the embodiment, the CNTs can be subjected to one or more processing steps. In some embodiments, the CNTs have been purified. Exemplary purification techniques include, but are not limited to, those by Chiang et al. [Chiang et al., *J. Phys. Chem. B* 2001, 105, 1157-1161; Chiang et al., *J. Phys. Chem. B* 2001, 105, 8297-8301]. In some embodiments, the CNTs have been cut by a cutting process. See Liu et al., *Science* 1998, 280, 1253-1256; Gu et al., *Nano Lett.* 2002, 2(9), 1009-1013; Haddon et al., *Materials Research Society Bulletin*, 2004, 29, 252-259. The terms "carbon nanotube" and "nanotube" will be used interchangeably herein.

While not intending to be bound by theory, the diversity in electronic structure of CNTs arises from the unique quantinization of the electronic wavevector of the 1-D system through the conceptual rolling of a graphene plane into a cylinder forming the nanotube [M. S. Dresselhaus, G. Dresselhaus, P. C. Eklund, *Science of Fullerenes and Carbon nanotubes*, Academic Press, San Diego, 1996; R. Saito, G. Dresselhaus, M. S. Dresselhaus, *Physical Properties of Carbon Nanotubes*, Imperial College Press, London, 1998]. The vector in units of hexagonal elements connecting two points on this plane defines the nanotube chirality in terms of two integers: n and m. When |n−m|=3q or zero, where q is an integer, the nanotube is metallic or semi-metallic, while the remaining species are semi-conducting with a geometry-dependent bandgap [Reich et al., *Physical Review B*, 2000, 62, 4273-4276]. Although largely unrealized in previous studies, subtle differences in the geometric structure of carbon nanotubes lead to dramatic changes in the rates of solution phase reactivity of these species. Applicants have found that watersoluble diazonium salts [Bravo-Diaz et al., *Langmuir*, 1998, 14, 5098], which have been shown to react with carbon nanotubes [Bahr et al., *J. Mat. Chem.*, 2002, 12, 1952-1958; Dyke et al., *J. Am. Chem. Soc.*, 2003, 125, 1156; Bahr et al., *J. Am. Chem. Soc.*, 2001, 123, 6536-6542], and nanotubes that are surfactant-wrapped [Dyke et al., *Nano Lett.*, 2003, 3, 1215-1218] can extract electrons from nanotubes in the formation of a covalent aryl bond (FIG. 1A) [Dyke et al., *Synthetic Lett.*, 2004, 155-160] and thereby demonstrate superb chemoselective reactions with metallic tubes over the semiconducting tubes. Referring to FIG. 1, (A) diazonium reagents extract electrons, thereby evolving $N_2$ gas and leaving a stable C—C covalent aryl bond to the nanotube surface; (B) the extent of electron transfer is dependent on the density of states in that electron density near $E_F$ leads to higher initial activity for metallic and semimetallic nanotubes; and (C) the arene-functionalized nanotube may now exist as the delocalized radical cation, which could further receive electrons from neighboring nanotubes or react with fluoride or diazonium salts. See Dyke et al., *Synthetic Lett.*, 2004, 155-160; Strano et al., *Science*, 2003, 301, 1519.

Figure 1B:
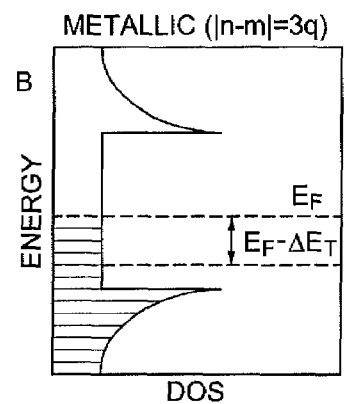
Figure 1C:
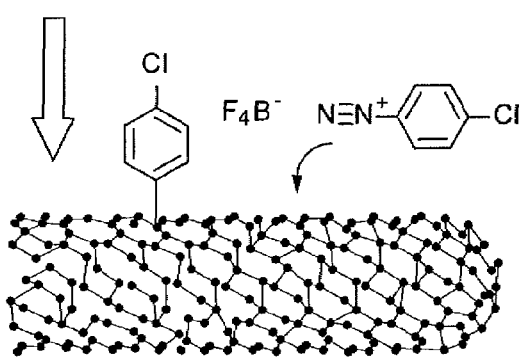
Figure 1D:
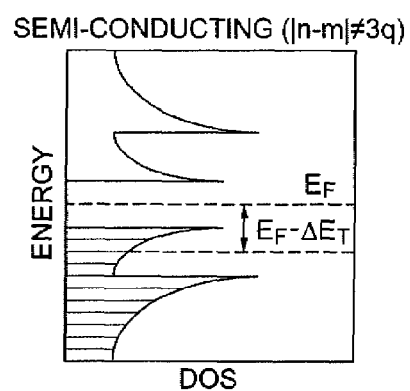

The above-described bonding forms with extremely high affinity for electrons with energies, $\Delta E_r$, near the Fermi level, $E_f$, of the nanotube (FIG. 1B). Again, while not intending to be bound by theory, it is suggested that the reactant forms a charge transfer complex at the nanotube surface, where electron donation from the latter stabilizes the transition state and accelerates the forward rate. Once the bond symmetry of the nanotube is disrupted by the formation of this defect, adjacent carbons increase in reactivity (FIG. 1C) and the initial selectivity is amplified as the entire nanotube is functionalized.

Carbon nanotube chemistry has been correctly described using a pyramidization angle formalism [S. Niyogi et al., *Acc. of Chem. Res.*, 2002, 35, 1105-1113]. Here, chemical reactivity and kinetic selectivity are related to the extent of s character due to the curvature-induced strain of the $sp^2$-hybridized graphene sheet. Because strain energy per carbon is inversely related to nanotube diameter, this model predicts smaller diameter nanotubes to be the most reactive, with the enthalpy of reaction decreasing as the curvature becomes infinite. While this behavior is most commonly the case, the role of the electronic structure of the nanotubes in determining their reactivity is increasingly important—especially when desiring selectivity among a population of similar-diameter CNTs (such as is often the case with SWNT product). Furthermore, because such structure is highly sensitive to chiral wrapping, chemical doping, charged adsorbates, as well as nanotube diameter, there exists a considerable diversity among these various pathways in addition to a simple diameter dependence.

Selective Functionalization

In general, processes for selectively functionalizing carbon nanotubes comprise the steps: a) selecting a quantity of carbon nanotube material; b) suspending the carbon nanotube material in a solvent; and c) adding a chemical reactant that is able to selectively functionalize the carbon nanotube material based on the electronic properties of the nanotubes.

More specifically, in some embodiments, processes for selectively functionalizing carbon nanotubes comprise the steps: a) selecting a quantity of carbon nanotube material; b) adding the carbon nanotube material to an aqueous surfactant solution and homogenizing to form a mixture comprising surfactant-suspended carbon nanotubes; and c) adding a suitable diazonium species to the mixture in an amount which is suitable to react preferentially with the metallic and semimetallic carbon nanotubes, but not with the semiconducting carbon nanotubes.

Surfactants, according to the present invention, can be any chemical agent which facilitates the dispersion of carbon nanotubes in water. Surfactants include, but are not limited to, ionic surfactants, non-ionic surfactants, cationic surfactants, anionic surfactants, sodium dodecyl sulfate (SDS), sodium dodecylbenzene sulfonate (SDBS), sodium octylbenzene sulfonate, TRITON X-100, TRITON X-405, dodecyltrimethylammonium bromide (DTAB), and combinations thereof. However, organically-wrapped CNTs in an organic solvent could also be partners for this reaction with a diazonium salt in a selective coupling, provided the wrapped species are single nanotubes, or small bundles thereof, i.e., on the order of 2-3 nanotubes, such that the individual nanotubes are accessible for the selective functionalization process.

In some embodiments of the present invention, the process of forming an aqueous mixture of surfactant-suspended carbon nanotubes comprises a homogenizing step. A homogenizing step, according to the present invention, can be any method which suitably homogenizes the mixture and renders at least some of the carbon nanotubes encapsulated in micellar-like assemblies.

In some embodiments of the present invention, the process of forming an aqueous mixture of surfactant-suspended carbon nanotubes further comprises ultrasonic assistance. Ultrasonic assistance can be provided by either an ultrasonic bath or an ultrasonic horn sonicator, typically operating at a power from between about 200 W to about 600 W. The duration of such ultrasonic assistance typically ranges from about 1 min to about 20 min.

In some embodiments of the present invention, the mixture of surfactant-suspended carbon nanotubes is centrifuged to separate the surfactant-suspended nanotube material from other material. In such embodiments, the other material gravitates to the bottom and the surfactant-suspended carbon nanotubes are decanted. In some embodiments of the present invention, the centrifugation is provided by an ultracentrifuge, and centrifugation is performed with an intensity which ranges generally from about 10,000 rpm to about 90,000 rpm, and for a duration which ranges generally from about 1 hour to about 6 hour.

In some embodiments of the present invention, aryl diazonium salts are used as the diazonium species. Suitable aryl diazonium salts include, but are not limited to,

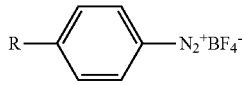

where R is selected from the group consisting of halogen, nitro, cyano, alkyl, aryl, arylalkyl, hydroxy, carboxylic ester, carboxylic acid, thiocarbonate, amide, alkoxy, polyether, polyalkyl, hydroxy alkyl, and combinations thereof. Variations for "R" include: a) aliphatic chains or groups for nonpolar solvent solubility; b) polystyrene, polyethylene, polypropylene, etc. for incorporation into composites or blends; c) electrically-conducting polymeric substituents (i.e., polypyrrole or poly(phenylene vinylene)); d) polyether chain to increase water or alcohol solubility; e) carboxylic acid or carboxylate anion to increase water solubility; f) substituents that can cross-link polymers to form composites; g) R can be substituted at various positions on the aromatic ring (ortho, meta, para); h) there are multiple "R" groups; and, when present, use of Cl, Br, and I as leaving groups to attach to a metal surface or nanoparticle.

In some embodiments of the present invention, the aryl diazonium salt is first solubilized in water or another solvent, prior to adding it to the mixture of surfactant-suspended carbon nanotubes, and allowing it to react with the nanotubes. In such embodiments, a substoichiometric amount of the aryl-diazonium salt is added such that it reacts preferentially with the metallic (no bandgap) and semi-metallic ("Mod 3" nanotubes (where n–m=multiple of 3) possessing a very small bandgap, sometimes referred to as a "pseudo-gap," that is curvature induced) carbon nanotubes, but not with the semiconducting carbon nanotubes.

In some embodiments of the present invention, Raman, absorption, and/or fluorescence spectroscopies are used to used to analyze the process during and after the reaction to indicate the reaction is selective-favoring reaction of metallic and semi-metallic nanotubes first.

In some embodiments of the present invention, upon completion of the partial reaction (i.e., reaction of the metallic and semimetallic nanotubes, but not the semiconducting nanotubes), a destabilizing agent can be added to destabilize the micellar assemblies and permit filtration. In some embodiments, the destabilizing agent used is N,N-dimethylformamide (DMF).

Since the selective reactivity is a function of the size of the band gap, continued addition of diazonium species will continue to react preferentially with the smallest band gap unreacted nanotubes present in the mixture. As these are preferentially reacted, the reaction will shift to the nanotubes with the next larger bandgap. Ultimately, if enough aryl diazonium salt is added, all of the nanotubes will react.

In some embodiments, however, the reaction selectivity is observed only with low conversion, meaning that the surface coverage of the functional group is relatively small under selective conditions.

In some embodiments of the present invention, the diazonium species is generated in situ by reacting a substituted aniline species with an alkyl nitrite (or alternatively an inorganic nitrite in the presence of an acid). Substituted aniline species, according to the present invention, have the general formula

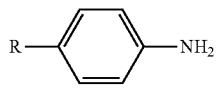

where R (the substituent, or substituents in the case of multiple substitutions) is selected from the group consisting of halogen, nitro, cyano, alkyl, aryl, arylalkyl, OH, carboxylic ester, carboxylic acid, thiocarbonate, amide, alkoxy, polyether, polyalkyl, hydroxyl alkyl, and combinations thereof.

In some embodiments of the present invention, the diazonium species is generated in situ by reacting a dialkyltriazene with acid. Generally, any method of producing a diazonium species, or its synthetic equivalent, will work.

In some embodiments, as an alternative to dispersing the CNTs with the aid of surfactants, the CNTs are dispersed in a superacid media such as oleum. Generally, any method of dispersing CNTs, especially as individual (unbundled) nanotubes, and that is compatible with any of the diazonium species described above, will work.

Separation of Carbon Nanotubes

In some embodiments of the present invention, the aryl diazonium salts are selected such that they possess functional groups that are sensitive to changes in pH of the mixture of surfactant-suspended carbon nanotubes that have been partially reacted with said diazonium salt. In some embodiments of the present invention the diazonium salt is

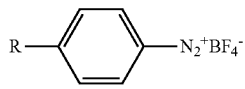

where R is an OH (i.e., phenolic) group. At high pH values (e.g., >10), the OH groups are deprotonated. In embodiments where the metals and semi-metals have been preferentially functionalized, these species can be separated from the semiconducting carbon nanotubes using electrophoretic techniques like gel or capillary electrophoresis at these high pH values.

Thus, the reaction chemistry can be carried out such that all metallic nanotubes are selectively functionalized via phenol moieties, then separated by electrophoretic means yielding carbon nanotubes of specific type and which are not agglomerated in rope-like bundles. After recovery of the fractionated material, thermal treatment of the metallic nanotubes drives off the functional groups and the resulting unfunctionalized nanotubes recover their original properties.

In some or other embodiments, changes in the solubility of CNTs of different type within a mixture of types, as a result of their selective functionalization, are exploited to facilitate their separation. For example, to a surfactant-suspended dispersion of CNTs can be added a substoichiometric amount of diazonium species that reacts preferentially with the metallic and semi-metallic CNTs to render only these types functionalized. A reagent (e.g., DMF) can then be added to destabilize the surfactant-suspension at which point the CNTs flocculate out of suspension. Filtration and washing of this CNT material yields a solid mixture of functionalized metallic and semi-metallic CNTs and unfunctionalized semiconducting CNTs. Dispersal of this solid product in a solvent for which the functionalizing groups have affinity allows the functionalized metallic and semi-metallic CNTs to be suspended, while the unfunctionalized semiconducting CNTs remain unsuspended. Separation can be accomplished via centrifugation and decantation or other means.

The most immediate and obvious use of this invention is as a route to the separation of carbon nanotubes based on their electronic structure. By selectively functionalizing metallic nanotubes, or small band gap semiconducting nanotubes, the remaining species can, in some embodiments of the present invention, be separated by using changes in solubility that come about as a result of the functionalization. The increase in molecular weight can also be utilized for this purpose. Additionally, the functionalization can be used to selectively disrupt conduction in the metallic and semi-metallic CNTs. Other applications include fabrication of electronic devices consisting of all metallic nanotubes from a starting mixture of all electronic types. The diazonium reaction can be employed to generate highly functionalized materials.

No other method of functionalization of single-wall carbon nanotubes has been shown to be selective to the electronic structure of the nanotube. This discovery is enabled by spectroscopic techniques for carbon nanotubes that have only recently become available. In particular, photoabsorption spectroscopy and fluorescence detection are employed to follow the reaction progression and monitor the effect of substituent addition to the nanotube electronic structure. Also, no other method exists to uniformly functionalize carbon nanotubes in solution. Previously, functionalized nanotubes consisted of highly functionalized nanotubes and unfunctionalized nanotubes. This observation was attributed to the bundling that occurs with nanotubes in the solid state.

EXPERIMENTAL EXAMPLES

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Example 1

This Example serves to illustrate the selective reaction of surfactant-suspended CNTs with diazonium species in accordance with some embodiments of the present invention.

Micelle-coated (surfactant-suspended) single-wall carbon nanotubes are generated via homogenation of raw material and 1% of sodium dodecyl sulfate in water or deuterium oxide ($D_2O$) for 1 hour, followed by sonication for 10 minutes. The solution is then centrifuged for 4 hours and decanted to generate the micelle-coated nanotubes. The pH is then adjusted with 1.0 N NaOH to approximately 10, and one of a variety of diazonium salts is added to the aqueous solution/suspension. The diazonium salt can be added as a solid directly to the decanted material, or the diazonium salt can be dissolved in water or $D_2O$ and then added as a dilute solution. When a large excess of the salt is added, selectivity is not observed, but all the nanotubes are functionalized to a high degree. For selective functionalization, a dilute solution of the salt is prepared by solubilizing the diazonium salt in water or $D_2O$ (roughly 1.5 M), and an aliquot (roughly 5 μL) of this solution is added to the nanotube decants with stirring. The reaction can be monitored by several spectroscopic techniques in order to determine the extent of functionalization. Once the functionalization is complete, the reaction mixture is diluted with some organic solvent (e.g., acetone, DMF), and the flocculated nanotubes are then collected by filtration over a polytetrafluoroethylene (PTFE) membrane. The collected solid is then washed with acetone and water to remove unreacted diazonium salt, diazonium decomposition side-products, and sodium dodecyl sulfate. The nanotube sample is then collected from the membrane and dried in a vacuum oven at 60° C.

The description here is not meant to be limiting. There are variations in concentration and reaction times, as well as methods for generating the intermediates that could be made. For example, one could generate the diazonium salts in situ from an aniline and an alkyl nitrite or an aniline and sodium nitrite/acid. Furthermore, the diazonium salts that respond best, to date, are aryldiazonium salts, however, this should not be construed as a limitation. Functional groups or substituents on the aryl ring can be varied to modify the hydrophilic and hydrophobic character of the nanotube addends to enhance separation efficacy or other properties.

Example 2

This Example serves to illustrate how selective functionalization can be followed with absorption spectroscopy.

The evidence for selective functionalization can be observed in the ultraviolet-visible-near infrared (UV-vis-NIR) absorption spectrum of the solution during and after the reaction. The reaction at the nanotube surface necessarily disrupts the photoexcitation process that normally gives the nanotube a prominent and sharp absorption maximum in this spectrum. FIG. 2 shows that nanotubes having such a maximum at longer wavelengths (lower energy band gaps) are affected disproportionately at lower concentrations as their peaks decay. Referring to FIG. 2, (A) UV-vis-NIR spectra of sodium dodecyl sulfate-suspended carbon nanotubes after the addition of various amounts of 4-chlorobenzenediazonium tetrafluoroborate (in mol/1000 mol carbon), and wherein (B) is an expanded view of the metallic region, wherein the peaks a-f, corresponding to 0.0, 2.1, 3.9, 5.6, 9.1, and 11.8 side groups per $10^3$ nanotube carbons, respectively, are seen to decrease with increasing side group concentration. Thus, it is seen that smaller diameter nanotubes remain unaffected until larger reagent concentrations.

Figure 2A:
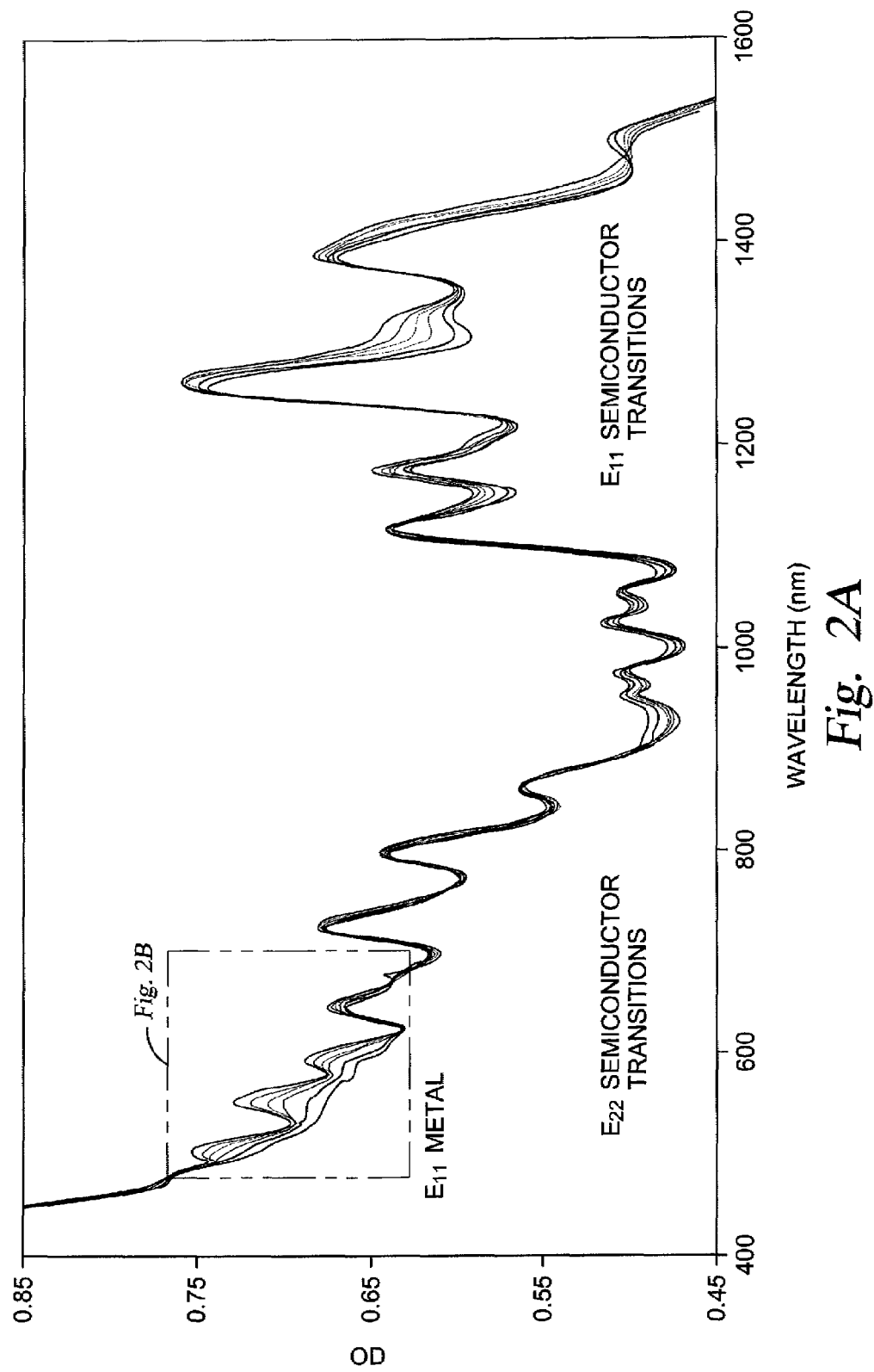
FIG. 2 depicts (A) UV-vis-nIR spectra of sodium dodecyl sulfate-suspended carbon nanotubes after the addition of various amounts of 4-chlorobenzenediazonium tetrafluoroborate (in mol/1000 mol carbon), and wherein (B) is an expanded view of the metallic region, wherein the peaks (a-f) are seen to decrease with increasing side group concentration.
Figure 2B:
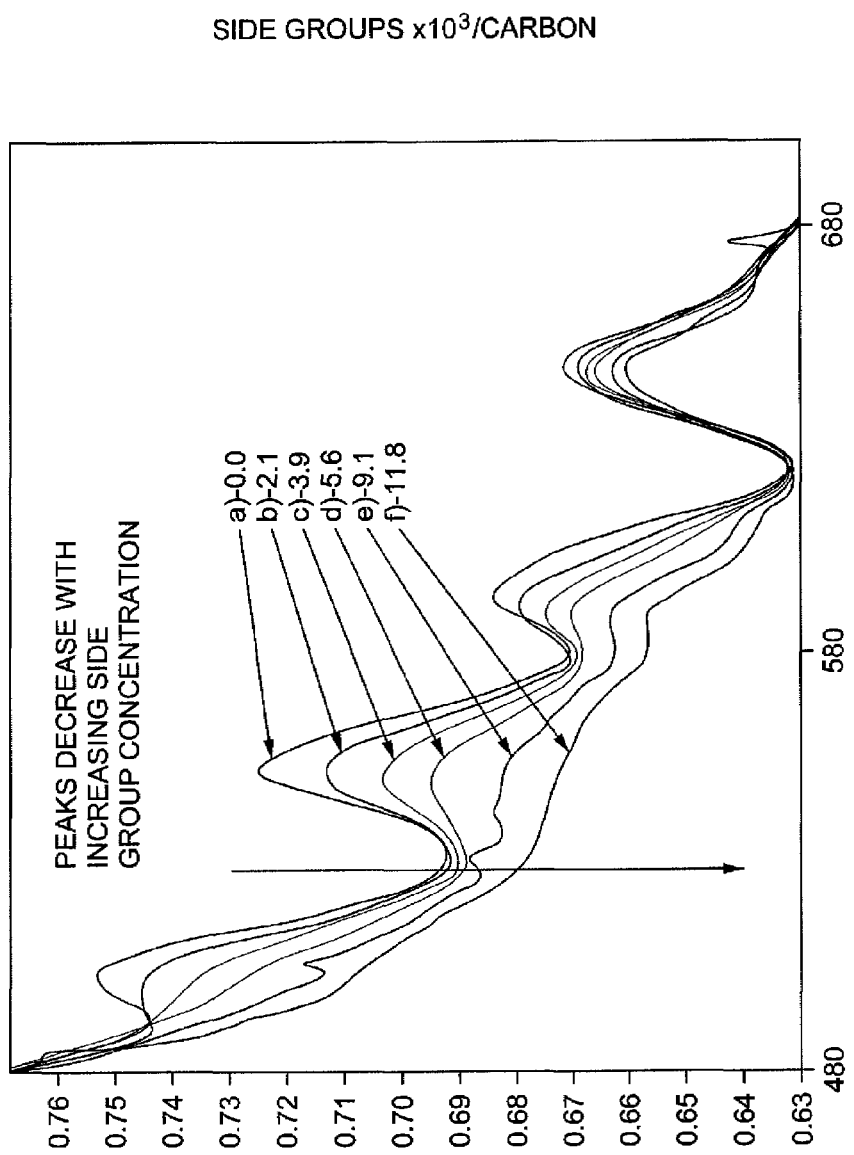

Under carefully controlled conditions, the above-described chemical behavior of CNTs can be exploited to obtain highly selective functionalization of metallic and semi-metallic nanotubes to the exclusion of the semiconductors. In one such embodiment, a recirculating flow reactor was used to transfer 150 mL/min of sodium dodecyl sulfate suspended carbon nanotubes through a cuvettes with inlet and outlet ports. To monitor this reaction in situ, continuous UV-vis-NIR spectra were generated after the addition of a metered amount of diazonium aryl chloride tetrafluoroborate. Additions were made in 0.05 mM increments after the system reached a steady state condition. FIGS. 2A and 2B show the UV-vis-NIR absorption spectra of aqueous suspended nanotubes after successive additions of 4-chlorobenzenediazonium tetrafluoroborate after steady state. The spectrum monitors the v1→c1 electronic transitions of the metallic and semi-metallic nanotubes from roughly 440 to 645 nm as well as the v1→c1 and v2→c2 of the semiconducting nanotubes in the ranges from 830 to 1600 nm and 600 to 800 nm respectively. These separated absorption features allow for the monitoring of valence electrons in each distinct nanotube; as the species reacts to form covalent linkages, electrons are localized and these maxima decay. In FIG. 2, it can be seen that under such controlled additions, only metallic transitions initially decay, indicating a highly preferential functionalization of metallic nanotubes (note that in FIG. 2B, the peaks decrease with increasing side group concentration). This selectivity is remarkable given that these transitions arise from electrons that are much lower in energy compared to the v1→c1 and v2→c2 transitions of the semiconductors. Indeed, the selective decay of these metallic transitions is unprecedented, and identifies this process as distinct from reversible electronic withdraw [Strano et al., *Journal of Physical Chemistry B*, 2003, 107, 6979-6985] or generic "doping" processes [Itkis et al., *Nanoletters*, 2002, 2, 155-159] as has been previously reported.

Example 3

This Example serves to illustrate how selective functionalization can be followed spectroscopically with Raman spectroscopy.

Figure 3A:
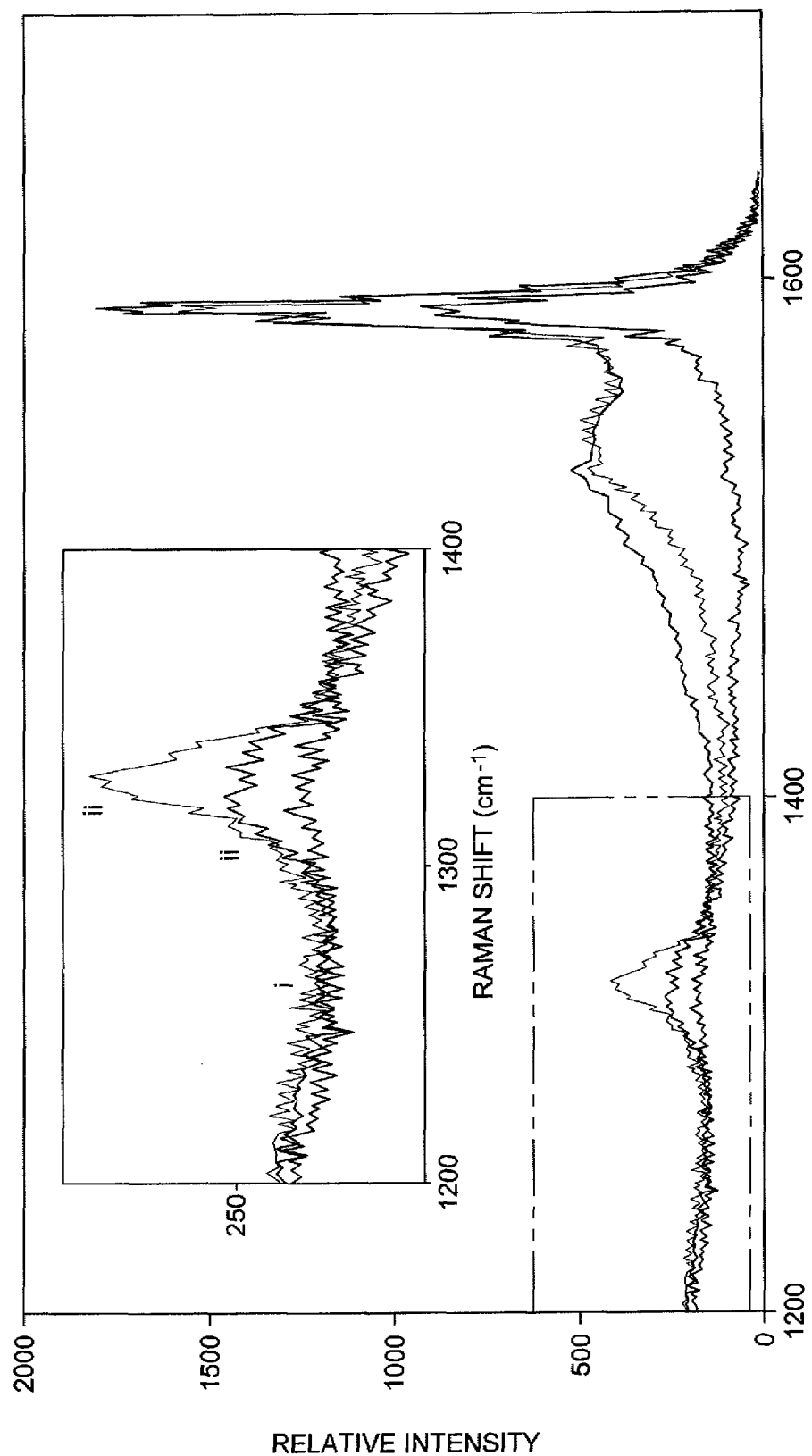
FIG. 3 depicts (A) Raman spectrum at 532-nm excitation, showing the growth of the "disorder" mode with increasing functionalization from 0 (i) to 5.6 (ii) to 22.4 (iii) groups attached per 1000 carbon atoms; wherein (B) the intensity of the tangential mode (TM)×0.1 decreases as resonance enhancement of the scattering event is lost with increasing reaction; and wherein the disorder mode, D, increases sharply then decays because of the same loss of enhancement.
Figure 3B:
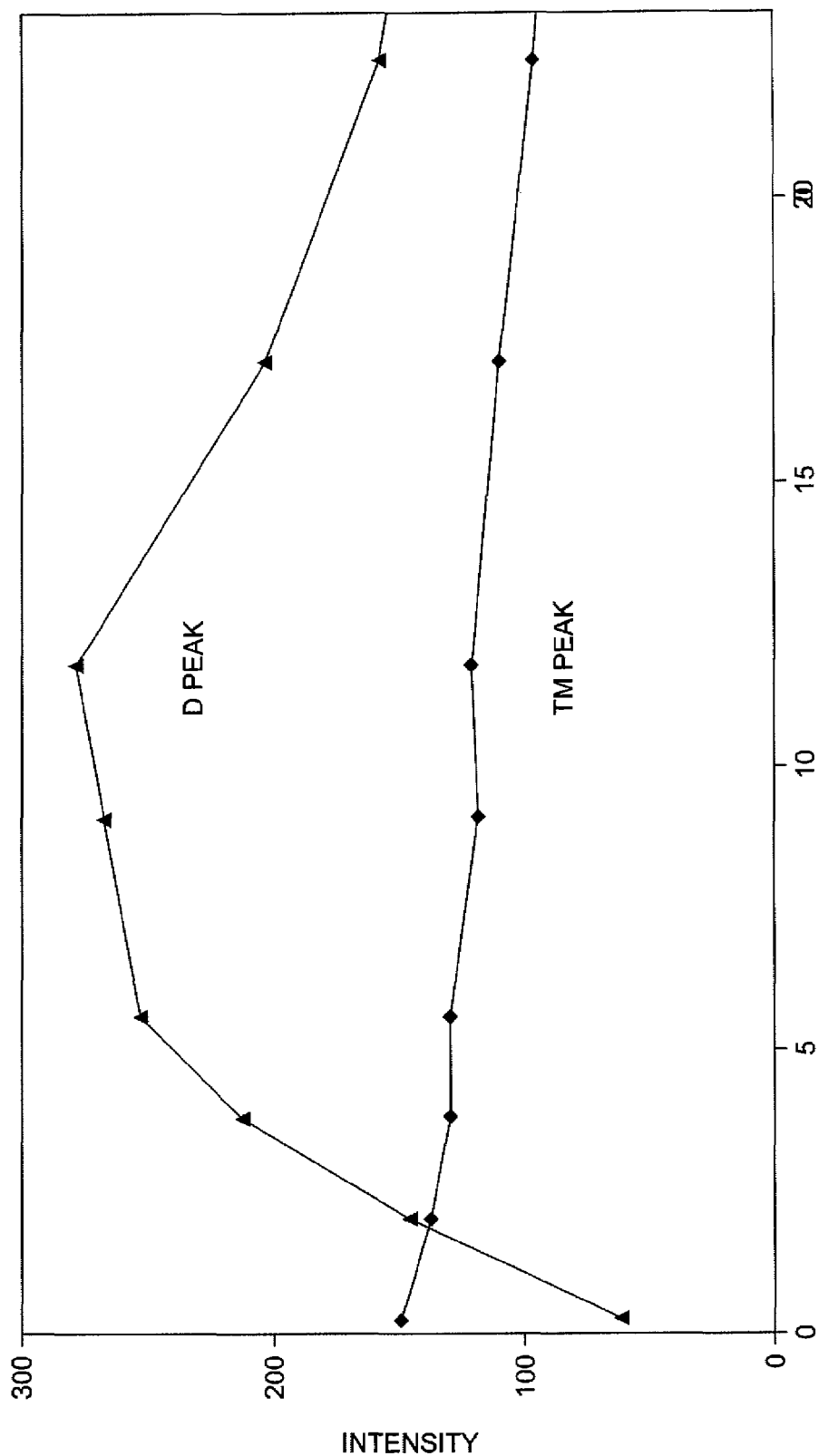

FIG. 3 shows the Raman spectrum at 532 nm excitation of the same solution after 0.05 mM reagent added. FIG. 3A shows the low Raman shift region that normally possesses peaks representative of distinct nanotube diameters that are resonant with the laser. Only one is visible (the lowest wavelength transition of the group as indicated.) FIG. 3B shows that the "D-band" has increased—a characteristic of functionalization but the largest band-gap nanotubes (also shown) still fluoresce indicating the absence of functionalization (unperturbed electronic transitions). All of this takes place at constant bulk pH=10.

Figure 4A:
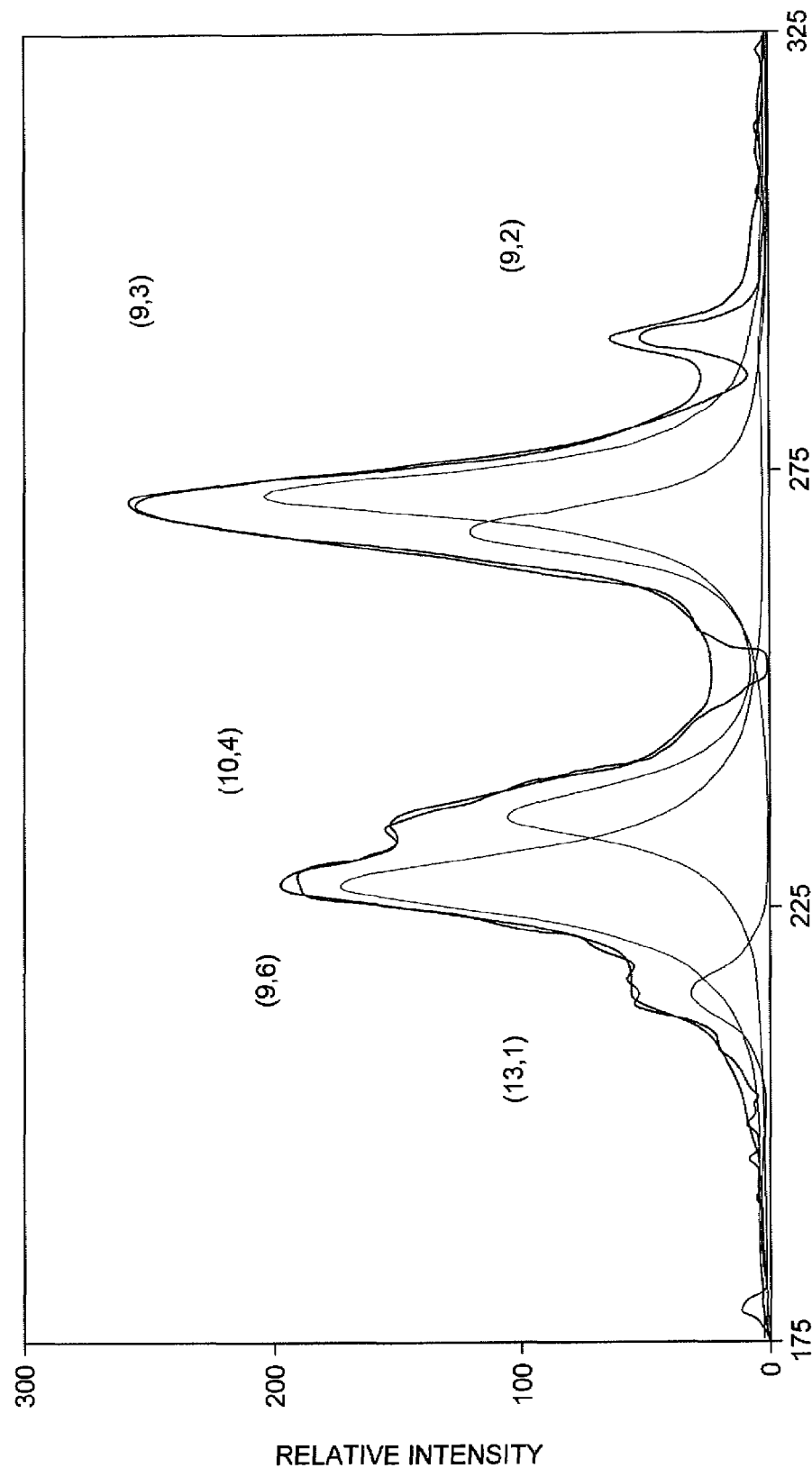
FIG. 4 depicts (A) low wavenumber Raman spectra at 532-nm excitation of the starting solution, wherein four metallic/semi-metallic nanotubes [(13,1), (9,6), (10,4), and (9,3)] are probed at this wavelength and one semiconductor (9,2) via a radial mode sensitive to nanotube diameter, wherein (B) after 5.6 groups attached per 1000 carbons, functionalization disrupts this mode, as seen by the decay particularly of the small-diameter metals, and providing initial evidence of selective reactivity among metals provides a handle for separation of these species, and wherein (C) after a ratio of 22.4, all metallic modes have decayed, leaving only the single semiconductor, in agreement with FIG. 2B.
Figure 4B:
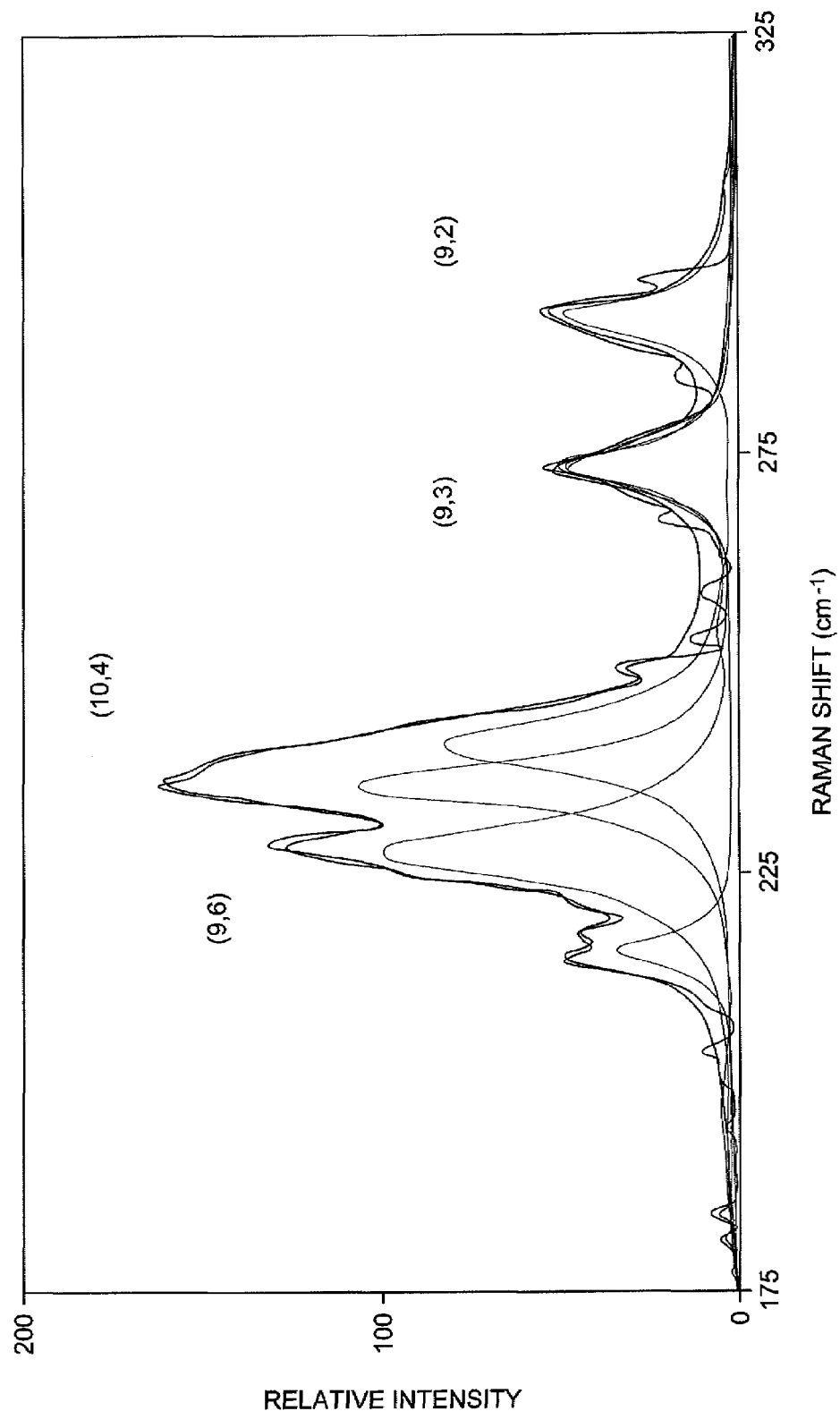
Figure 4C:
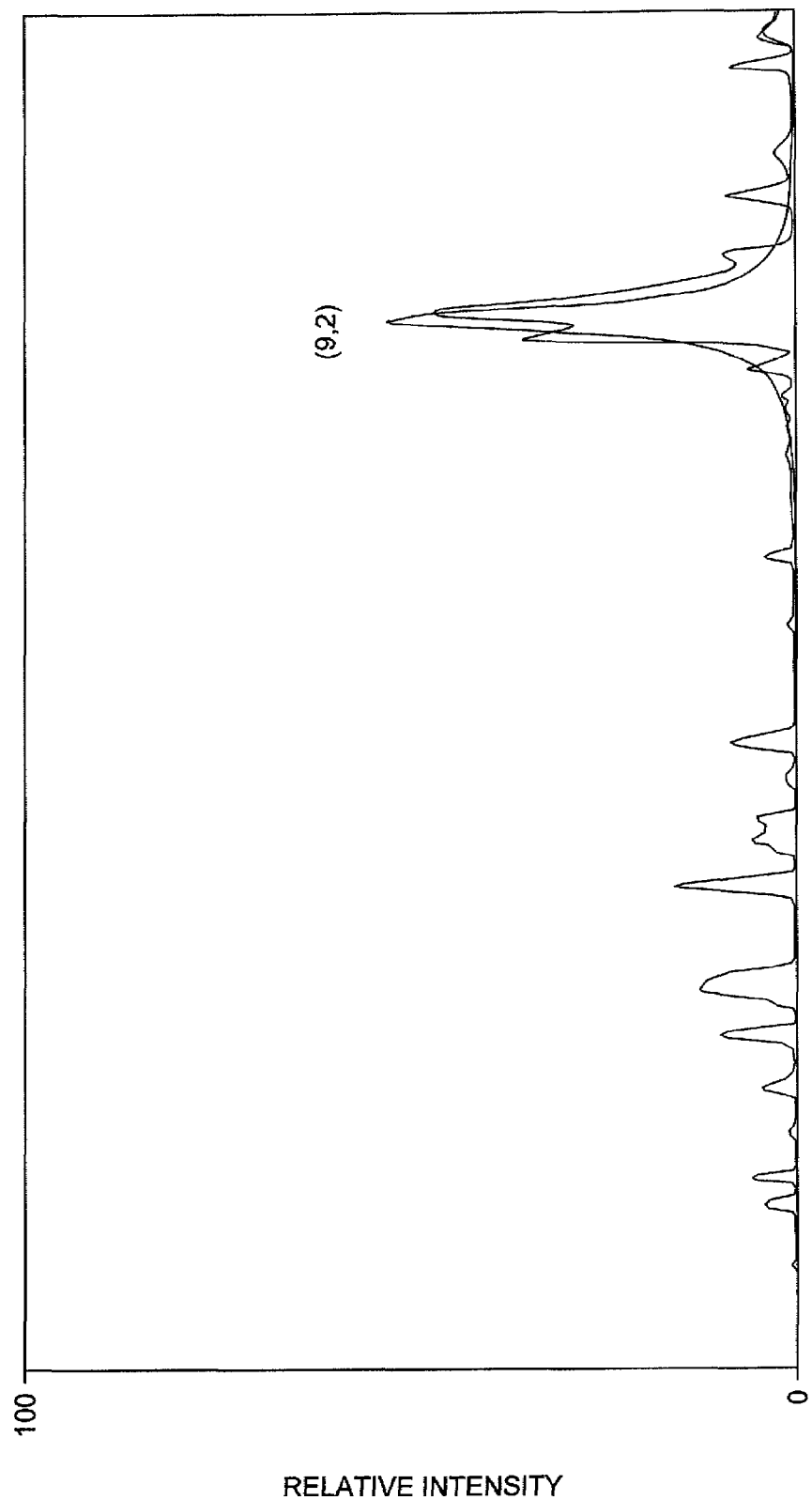

More specifically, this reaction selectivity is confirmed by the preservation of band-gap fluorescence of the semi-conducting nanotubes, which is known to be highly sensitive to chemical defects. Referring to FIG. 3, (A) Raman spectrum at 532-nm excitation, showing the growth of the "disorder" mode with increasing functionalization from 0 (i) to 5.6 (ii) to 22.4 (iii) groups attached per 1000 carbon atoms; wherein (B) the intensity of the tangential mode (TM)×0.1 decreases as resonance enhancement of the scattering event is lost with increasing reaction; and wherein the disorder mode, D, increases sharply then decays because of the same loss of enhancement. The functionalization increases the intensity of a phonon mode at 1330 cm$^{-1}$ (D-band) in the Raman spectrum as shown in FIG. 3A at 532 nm excitation. Its presence confirms the conversion of an sp$^2$ C to an sp$^3$ C on the nanotube during the formation of an sp$^3$ C-sp$^2$ C nanotube-aryl bond. This mode increases sharply with increasing functionalization, then decreases along with the C—C tangential mode ("TM-peak") as the system loses its electronic resonance (FIG. 3B). These results allow, for the first time, a spectroscopic correlation of the number of sidewall functionalization events to this phonon intensity at low conversion, and will be valuable for the control of nanotube sidewall chemistry. The addition of the moiety to the sidewall of the nanotube disrupts the radial phonon that gives rise to low frequency Raman lines distinct for species of a particular diameter which causes the mode to decay accordingly as the particular (n,m) nanotube reacts. FIG. 4 analogously shows the solution phase Raman spectra at 532 nm of the mixture with each reactant addition after steady state and the relative rates of the decays of these features reveals unprecedented reactivity differences between chiral semi-metallic species. Here, Raman spectroscopy probes nanotubes with nearly identical transition energies and these differences reveal a curvature dependent stabilization of the charge transfer complex that may ultimately be exploited to separate semi-metallic and metallic species. Referring to FIG. 4, (A) low wave-number Raman spectra at 532-nm excitation of the starting solution, wherein four metallic nanotubes [(13,1), (9,6), (10, 4) and (9,3)] are probed at this wavelength and one semiconductor (9,2) via a radial mode sensitive to nanotube diameter, wherein (B) after 5.6 groups attached per 1000 carbons, functionalization disrupts this mode, as seen by the decay particularly of the small-diameter metals, and providing initial evidence of selective reactivity among metals provides a handle for separation of these species, and wherein (C) after a ratio of 22.4, all metallic modes have decayed, leaving only the single semiconductor, in agreement with FIG. 2B. It is noted that when all v1→c1 transitions of semi-metallic and metallic species have decayed (FIG. 2), only one low-frequency Raman mode that has been previously assigned to the (9,2) semiconductor [Strano et al., *Journal of Physical Chemistry B*, 2003, 107, 6979-6985] remains unaffected. This serves as the first independent confirmation of the recent spectroscopic assignment of these features [Bachilo et al., *Science*, 2002, 298, 2361; M. S. Strano, *Nanoletters*, 2003, 3, 1091].

Example 4

This Example serves to illustrate how CNTs can be separated by type via selective functionalization.

Figure 6A:
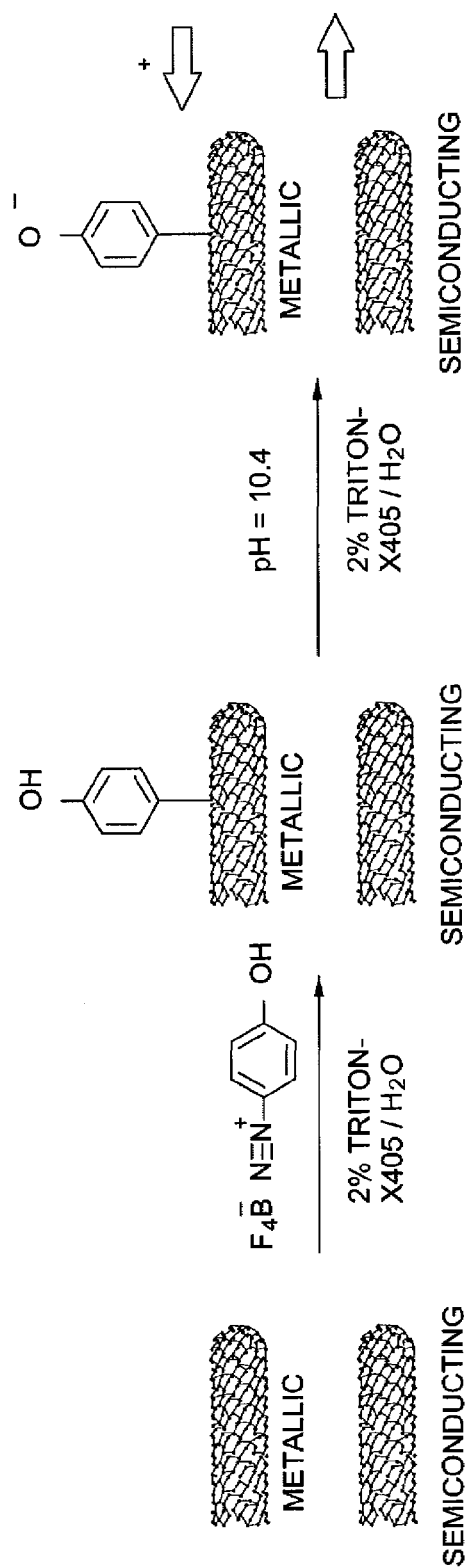
FIG. 6 depicts (A) the selective functionalization of metallic carbon nanotubes with phenol groups (added as a diazonium species) and their deprotonation at elevated pH; (B) an electrophoresis trace showing differential migration of unfunctionalized and phenol-functionalized carbon nanotubes; and (C) a comparison of the electrophoretic mobility between the unfunctionalized and phenol-functionalized carbon nanotubes, made by scaling the applied electric field.
Figure 6B:
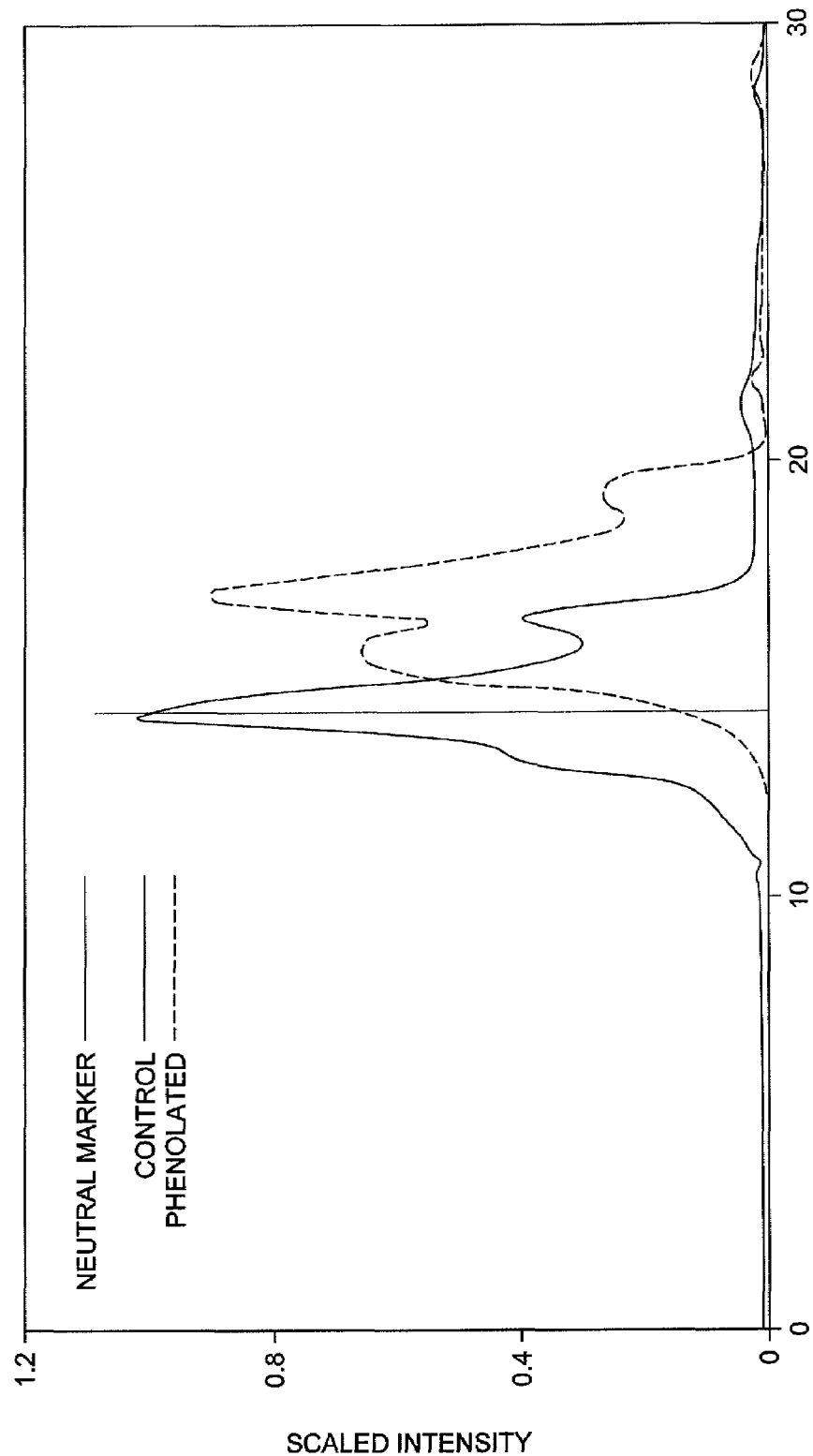
Figure 6C:
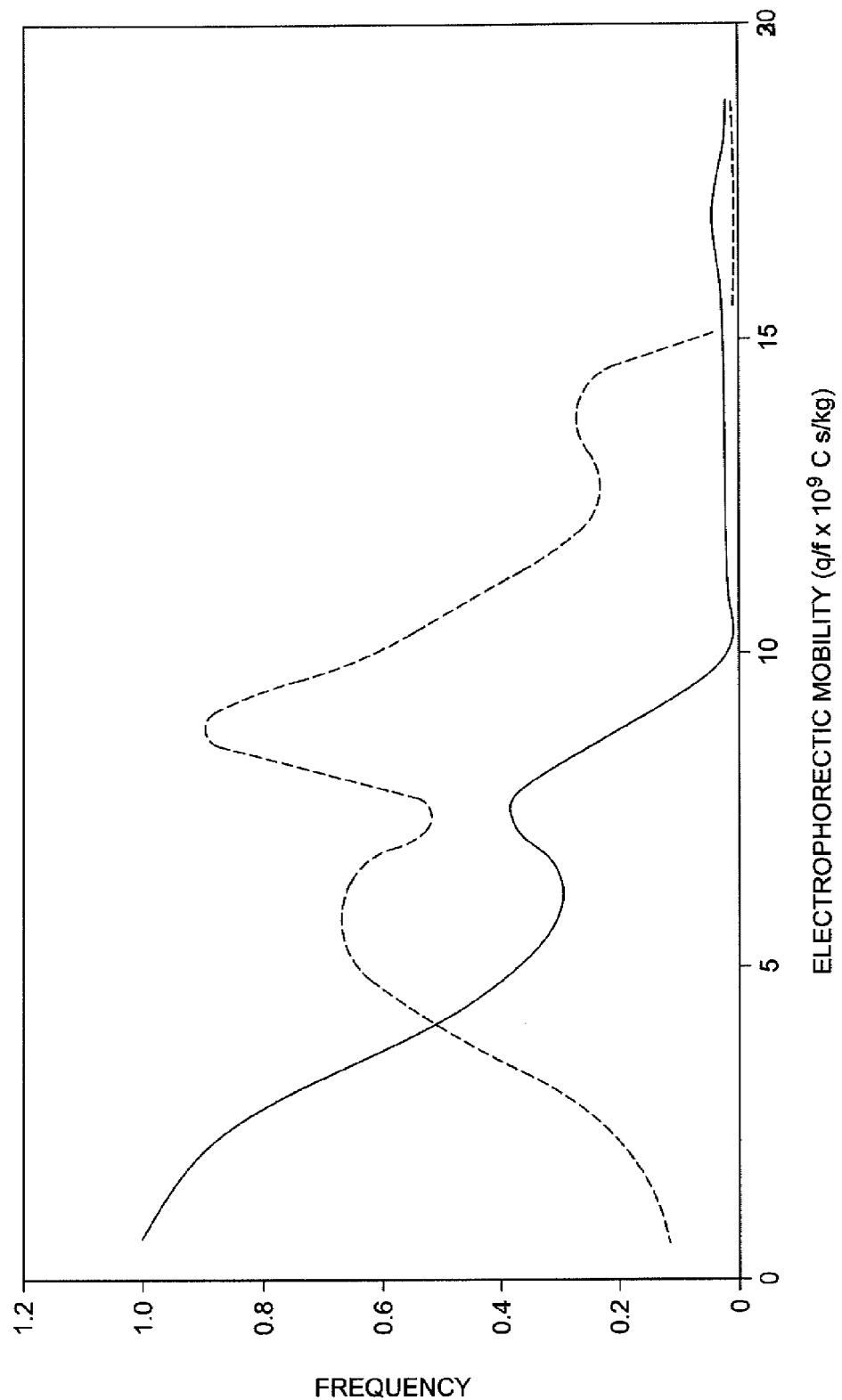

Selective functionalization as a handle for nanotube separations is unique in that it allows manipulation independent of tube length, unlike most chromatographic-based methods. Because the selectivity is nearly complete, this chemistry can form the basis for high efficiency separations in contrast to the minor enrichments that have been reported to date [Chattopadhyay et al., *J. Am. Chem. Soc.*, 2003, 125, 3370-3375; Zheng et al., *Nature Materials*, 2003, 2, 338-342]. Applicants have phenolated the sidewalls of metallic nanotubes with approximately 0.11 sidegroups per carbon and fractionated samples using electrophoretic means. Above a pH of 10.2, these phenol groups are deprotonated leaving a net negative charge per group on the nanotube (FIG. 6A). A non-ionic surfactant was used in this case to enhance the electrostatic changes upon functionalization. The change in electrophoretic mobility, $\mu$, was measured upon reaction using migration velocities during capillary electrophoresis (CE). This mobility is the observed velocity, v, normalized to the field strength across the capillary, E, and equal to:

$$\mu=(v/E)=(q/f)$$

where q is the net charge on the nanotube and f is a hydrodynamic resistance factor strongly dependent upon the length to diameter ratio (L/D) of the nanotube. The functionalization does not alter f since the length is unaffected, and the diameter of the tube is extended far less than the surfactant-adsorbed layer on the sidewall. However, the mobility is sensitive to charged groups at the nanotube surface. Unfunctionalized nanotubes in TRITON X-405 consistently show 3 distinct populations when fractionated by an applied electric field: those with $\delta^+$ charge from the adsorption of the cationic buffer molecules, those that are neutral, and those with $\delta^-$ charge from surface —OH and —COOH groups on the sides and ends of the tubes from processing. Partitioning between these three groups depends on the balance of cationic adsorption and anionic functionalities. FIG. 6B is a CE trace of unfunctionalized and phenol-functionalized material showing differences in migration times of 2 min. Deuterium oxide provides a neutral marker with species migrating later than this time being negatively charged. Scaling of the migration velocity by the applied field allows for a comparison of electrophoretic mobility distributions (towards the positive electrode) between reacted and unreacted nanotubes. In FIG. 6C, this comparison demonstrates how functionalized material is extracted from the total population by exploiting this change in mobility due to the negative charge.

Example 5

This Example serves to illustrate how selectively functionalized CNTs can be made to revert back to their unfunctionalized, pristine state.

Figure 5:
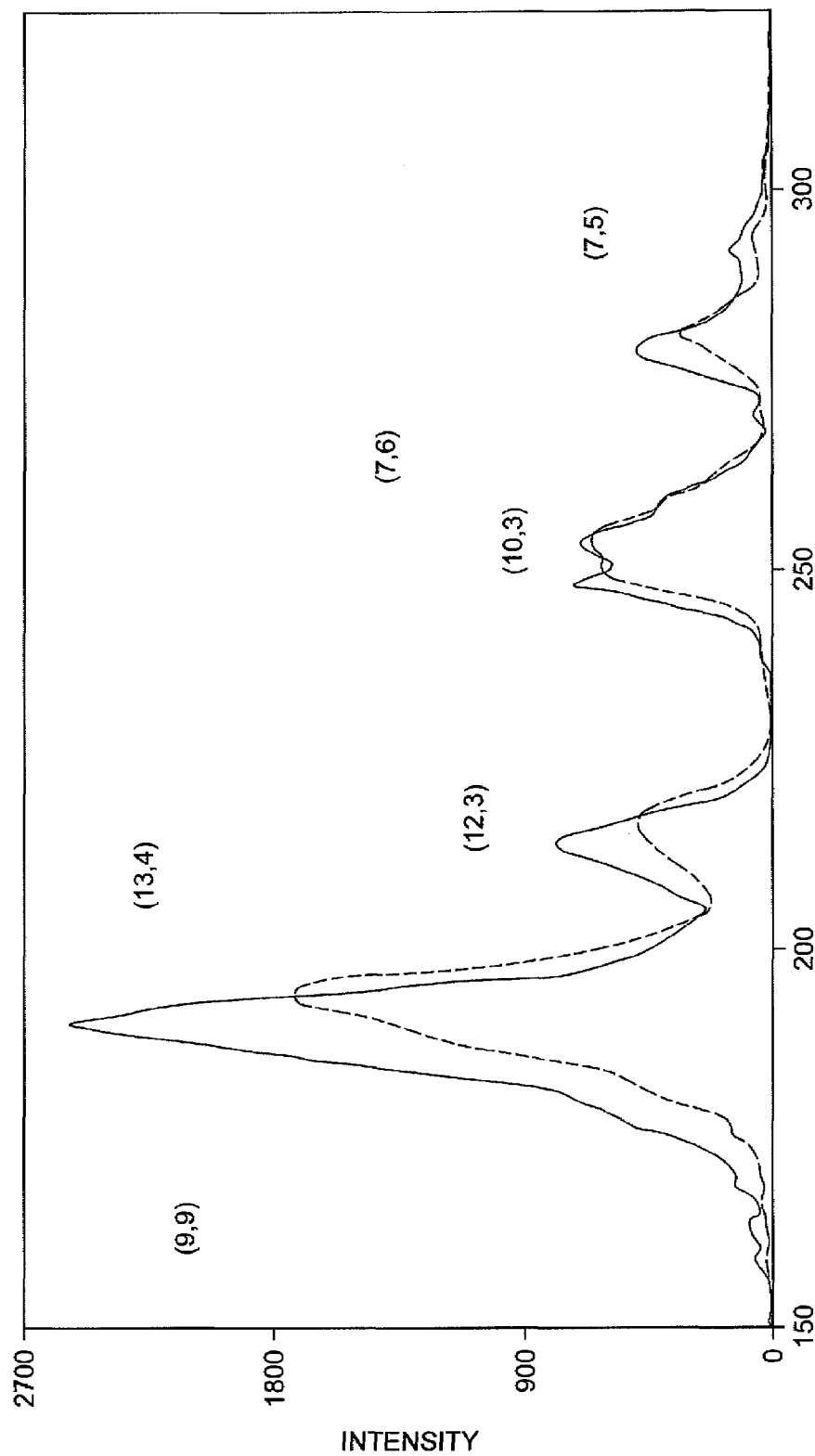
FIG. 5 depicts Raman spectra at 633 nm probing both metals and semiconducting nanotubes before reaction (solid line) and after recovery and thermal pyrolysis (dotted line), wherein the reversibility of the chemistry implies that intrinsic electronic and optical properties of the pristine nanotubes can be recovered.

Thermal pyrolysis of the reacted material at 300° C. in an atmosphere of flowing inert gas cleaves the aryl moieties from the sidewall and restores the spectroscopic signatures of the aromatic, pristine nanotubes [Bahr et al., *J. Mat. Chem.*, 2002, 12, 1952-1958]. FIG. 5 compares the Raman spectra before (solid line) and after (dotted line) recovery and thermal pyrolysis at 633 nm (FIG. 5). This wavelength was employed because it probes a mixture of metals and semiconductors for samples prepared by CO disproportionation [Strano, *Nanoletters*, 2003, 3, 1091]. Thus, the radial phonon modes are nearly completely restored after thermal treatment. Similarly, electronic transitions in the absorption spectrum are restored indicating the loss of the side group and a restoration of the original electronic structure of the nanotube. The reversibility of the chemistry implies that intrinsic electronic and optical properties of the pristine nanotubes can be recovered. Hence this selective chemistry can be used as a reversible route to separate, deposit or chemically link nanotubes of a particular electronic structure and the original optical and electronic characteristics can then be recovered.

In summary, diazonium reagents are shown to functionalize single walled carbon nanotubes suspended in aqueous solution with high selectivity and enable manipulation according to electronic structure. For example, metallic species can be reacted to the near exclusion of semiconducting nanotubes under controlled (e.g., substoichiometric) conditions. Selectivity is dictated by the availability of electrons near the Fermi level to stabilize a charge transfer transition state preceding bond formation. The utility of this chemistry as a means of manipulating single-wall carbon nanotubes by their electronic structure is demonstrated by the selective attachment of a phenol moiety and subsequent separation using electrophoretic means. The chemistry can be reversed using a thermal treatment that restores the pristine electronic structure of the nanotube.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method for separating carbon nanotubes based on their electronic type, said method comprising:
    a) suspending a plurality of carbon nanotubes in a solvent to form a plurality of suspended carbon nanotubes;
        wherein the plurality of suspended carbon nanotubes comprise metallic carbon nanotubes, semimetallic carbon nanotubes and semiconducting carbon nanotubes;
    b) reacting a substoichiometric amount of a functionalizing species with the plurality of suspended carbon nanotubes such that the metallic carbon nanotubes and the semimetallic carbon nanotubes, but not the semiconducting carbon nanotubes, react with the functionalizing species to form a mixture comprising functionalized metallic carbon nanotubes, functionalized semimetallic carbon nanotubes and unfunctionalized semiconducting carbon nanotubes;
        wherein the substoichiometric amount of the functionalizing species is with respect to the amount of carbon comprising the carbon nanotubes; and
        wherein the substoichiometric amount of the functionalizing species is selected such that a reaction of the functionalizing species occurs with the metallic carbon nanotubes and the semimetallic carbon nanotubes but not with the semiconducting carbon nanotubes; and
    c) separating the functionalized metallic carbon nanotubes and the functionalized semimetallic carbon nanotubes from the unfunctionalized semiconducting carbon nanotubes.

2. The method of claim 1, wherein the functionalizing species is a diazonium species.

3. The method of claim 2, wherein the diazonium species is an aryl diazonium salt.

4. The method of claim 3, wherein the aryl diazonium salt is generated in situ by reacting a substituted aniline species with an alkyl nitrite.

5. The method of claim 3, wherein the aryl diazonium salt has a structure

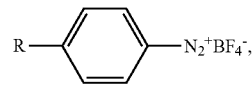

wherein R is selected from the group consisting of halogen, nitro, cyano, alkyl, aryl, arylalkyl, OH, carboxylic ester, carboxylic acid, thiocarbonate, amide, alkoxy, polyether, polyalkyl, hydroxyl alkyl, and combinations thereof; and wherein R can be substituted at various positions on the aromatic ring and there can be multiple R groups on the aromatic ring.

6. The method of claim 5, wherein R is OH.

7. The method of claim 1, wherein the functionalized metallic carbon nanotubes and the functionalized semimetallic carbon nanotubes comprise phenolic OH moieties.

8. The method of claim 7, wherein the functionalized metallic carbon nanotubes, the functionalized semimetallic carbon nanotubes and the unfunctionalized semiconducting carbon nanotubes are suspended in a surfactant solution.

9. The method of claim 8, further comprising:
deprotonating at least a portion of the phenolic OH moieties by raising the pH of the surfactant solution.

10. The method of claim 9, wherein deprotonating comprises raising the pH of the surfactant solution above 10.

11. The method of claim 9, wherein separating comprises an electrophoresis technique.

12. The method of claim 11, wherein the electrophoresis technique is selected from the group consisting of gel electrophoresis, capillary electrophoresis, and combinations thereof.

13. The method of claim 1, further comprising:
after separating, thermally defunctionalizing the functionalized metallic carbon nanotubes and the functionalized semimetallic carbon nanotubes to form defunctionalized metallic carbon nanotubes and defunctionalized semimetallic carbon nanotubes.

14. A method for separating carbon nanotubes based on their electronic type, said method comprising:
a) providing a plurality of functionalized carbon nanotubes suspended in a solution;
wherein the plurality of functionalized carbon nanotubes comprise functionalized metallic carbon nanotubes, functionalized semimetallic carbon nanotubes, and unfunctionalized semiconducting carbon nanotubes;
wherein the functionalized metallic carbon nanotubes and the functionalized semimetallic carbon nanotubes comprise phenolic OH moieties;
b) raising the pH of the solution above 10 such that at least a portion of the phenolic OH moieties become deprotonated; and
c) after raising the pH, separating the functionalized metallic carbon nanotubes and the functionalized semimetallic carbon nanotubes from the unfunctionalized semiconducting carbon nanotubes.

15. The method of claim 14, wherein separating comprises an electrophoresis technique selected from the group consisting of gel electrophoresis, capillary electrophoresis, and combinations thereof.

16. The method of claim 14, further comprising:
after separating, thermally defunctionalizing the functionalized metallic carbon nanotubes and the functionalized semimetallic carbon nanotubes to form defunctionalized metallic carbon nanotubes and defunctionalized semimetallic carbon nanotubes.

17. The method of claim 16, wherein thermally defunctionalizing comprises heating the functionalized metallic carbon nanotubes and the functionalized semimetallic carbon nanotubes at 300° C.

18. The method of claim 13, wherein thermally defunctionalizing comprises heating the functionalized metallic carbon nanotubes and the functionalized semimetallic carbon nanotubes at 300° C.

19. The method of claim 1, wherein separating comprises suspending the functionalized metallic carbon nanotubes and the functionalized semimetallic carbon nanotubes in a solvent in which the unfunctionalized semiconducting carbon nanotubes remain unsuspended.

20. The method of claim 1, wherein the solvent comprises a superacid.

21. A method for separating carbon nanotubes based on their electronic type, said method comprising:
a) suspending a plurality of carbon nanotubes in a surfactant solution to form a plurality of suspended carbon nanotubes;
wherein the plurality of suspended carbon nanotubes comprise metallic carbon nanotubes, semimetallic carbon nanotubes and semiconducting carbon nanotubes;
b) reacting a substoichiometric amount of a diazonium species with the plurality of suspended carbon nanotubes such that the metallic carbon nanotubes and the semimetallic carbon nanotubes, but not the semiconducting carbon nanotubes, react with the diazonium species to form a mixture comprising functionalized metallic carbon nanotubes, functionalized semimetallic carbon nanotubes and unfunctionalized semiconducting carbon nanotubes;
wherein the substoichiometric amount of the diazonium species is with respect to the amount of carbon comprising the carbon nanotubes; and
wherein the substoichiometric amount of the diazonium species is selected such that a reaction of the diazonium species occurs with the metallic carbon nanotubes and the semimetallic carbon nanotubes but not with the semiconducting carbon nanotubes; and
c) separating the functionalized metallic carbon nanotubes and the functionalized semimetallic carbon nanotubes from the unfunctionalized semiconducting carbon nanotubes.

22. The method of claim 21, wherein the diazonium species comprises an aryl diazonium salt.

23. The method of claim 22, wherein the aryl diazonium salt has a strcture

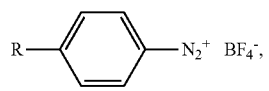

wherein R is selected from the group consisting of halogen, nitro, cyano, alkyl, aryl, arylalkyl, OH, carboxylic ester, carboxylic acid, thiocarbonate, amide, alkoxy, polyether, polyalkyl, hydroxyl alkyl, and combinations thereof; and
wherein R can be substituted at various positions on the aromatic ring and there can be multiple R groups on the aromatic ring.

24. The method of claim 21, wherein the functionalized metallic carbon nanotubes and the functionalized semimetallic carbon nanotubes comprise phenolic OH moieties.

25. The method of claim 24, further comprising:
deprotonating at least a portion of the phenolic OH moieties by raising the pH of the surfactant solution.

26. The method of claim 25, wherein deprotonating comprises raising the pH of the surfactant solution above 10.

27. The method of claim 25, wherein separating comprises an electrophoresis technique selected from the group consisting of gel electrophoresis, capillary electrophoresis, and combinations thereof.

28. The method of claim 21, further comprising:
after separating, thermally defunctionalizing the functionalized metallic carbon nanotubes and the functionalized semimetallic carbon nanotubes to form defunctionalized metallic carbon nanotubes and defunctionalized semimetallic carbon nanotubes.

29. The method of claim 28, wherein thermally defunctionalizing comprises heating the functionalized metallic carbon nanotubes and the functionalized semimetallic carbon nanotubes at 300° C.

30. The method of claim 21, wherein separating comprises suspending the functionalized metallic carbon nanotubes and the functionalized semimetallic carbon nanotubes in a solvent in which the unfunctionalized semiconducting carbon nanotubes remain unsuspended.

* * * * *

UNITED STATES PATENT AND TRADEMARK OFFICE
CERTIFICATE OF CORRECTION

| | | |
|---|---|---|
| PATENT NO. | : 7,887,774 B2 | |
| APPLICATION NO. | : 12/496100 | |
| DATED | : February 15, 2011 | |
| INVENTOR(S) | : Michael S. Strano et al. | |

It is certified that error appears in the above-identified patent and that said Letters Patent is hereby corrected as shown below:

Column 1, Line 4: replace "NCC-01-0203" with "NCC-01-02038"

Column 1, Line 7: insert --The government has certain rights in the invention.-- at the end of the line Signed and Sealed this
Twelfth Day of April, 2011

David J. Kappos
*Director of the United States Patent and Trademark Office*